Figure 11:
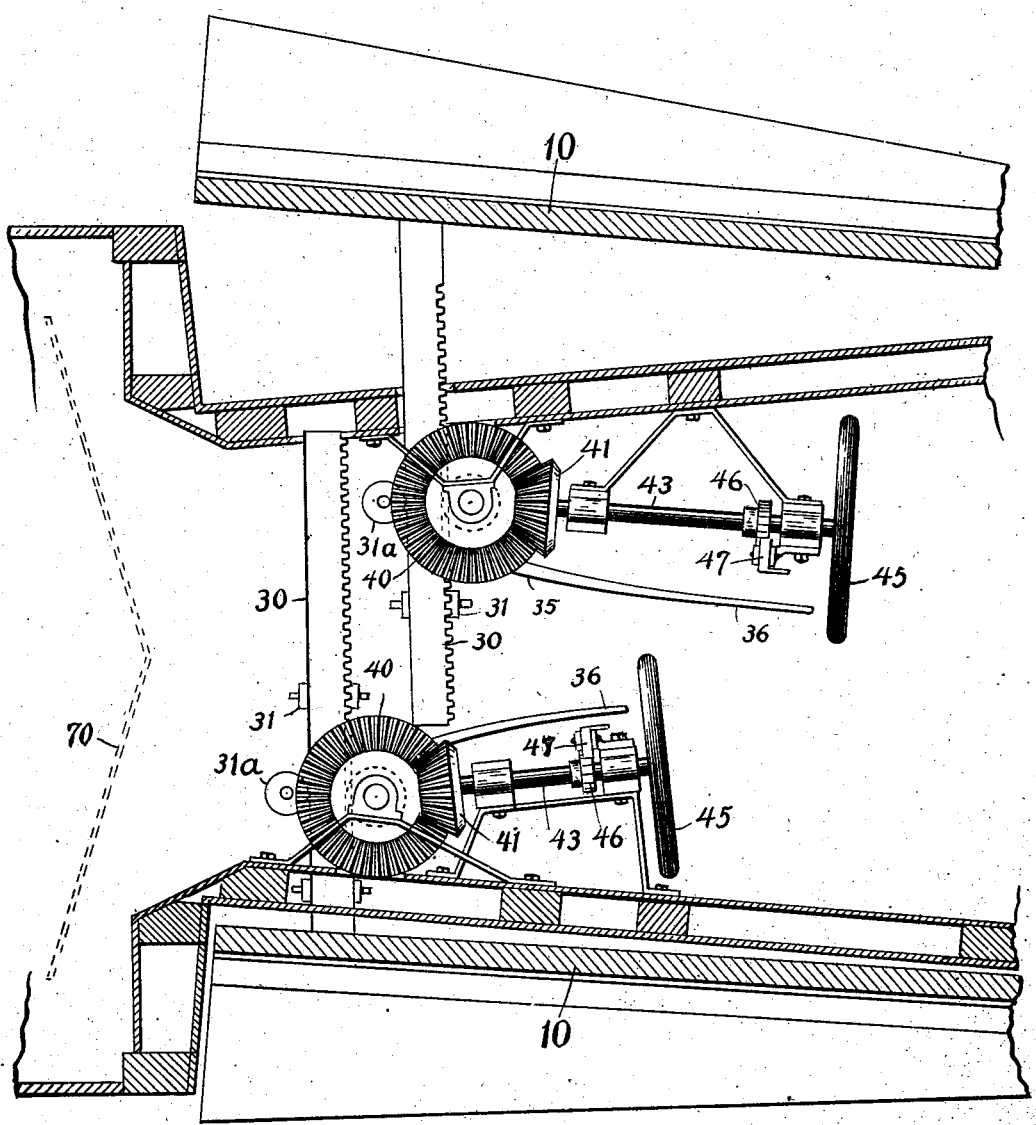

No. 721,241. PATENTED FEB. 24, 1903.
J. W. RUSSELL.
SNOW PLOW.
APPLICATION FILED SEPT. 11, 1900.
NO MODEL. 8 SHEETS—SHEET 1.
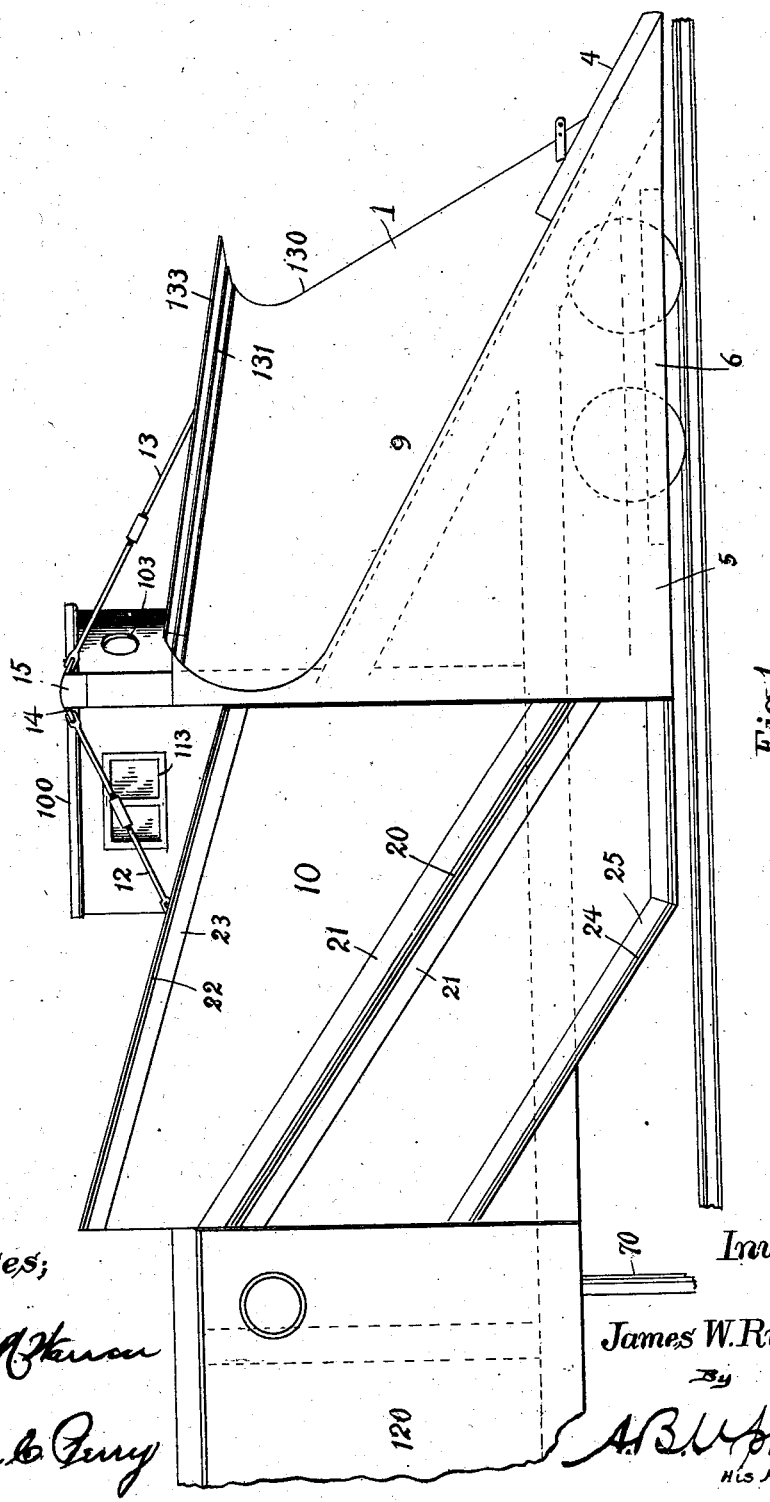

No. 721,241. PATENTED FEB. 24, 1903.
J. W. RUSSELL.
SNOW PLOW.
APPLICATION FILED SEPT. 11, 1900.
NO MODEL. 8 SHEETS—SHEET 2.
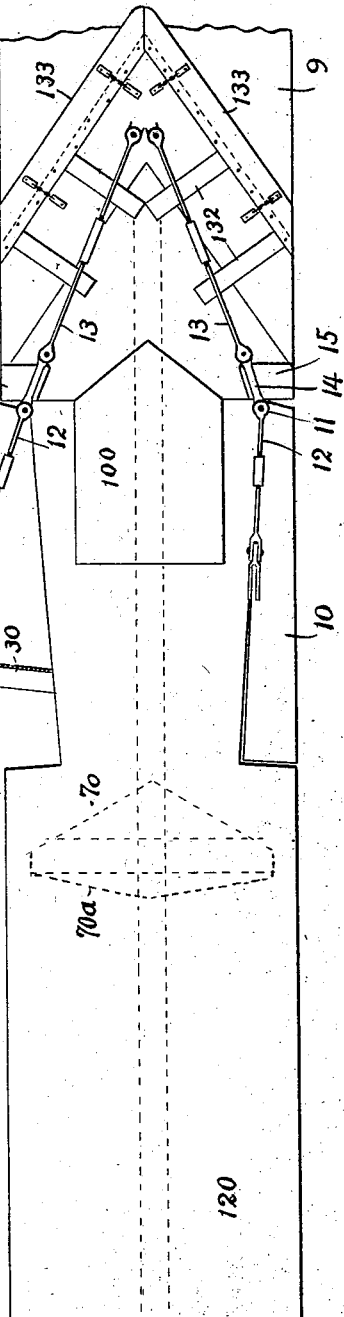
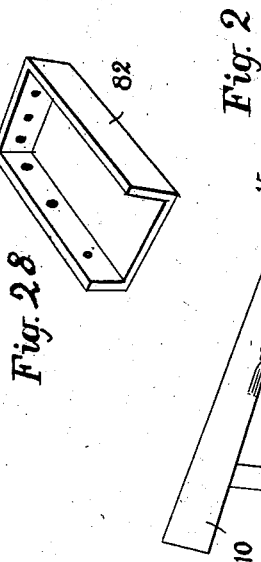
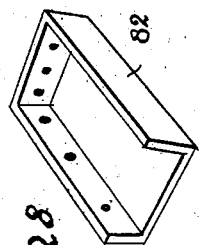
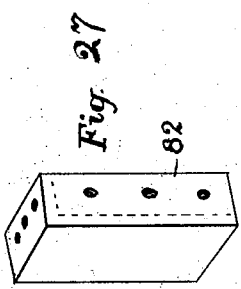
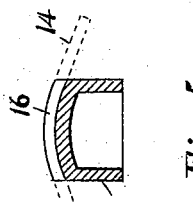
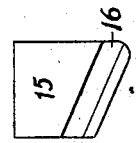
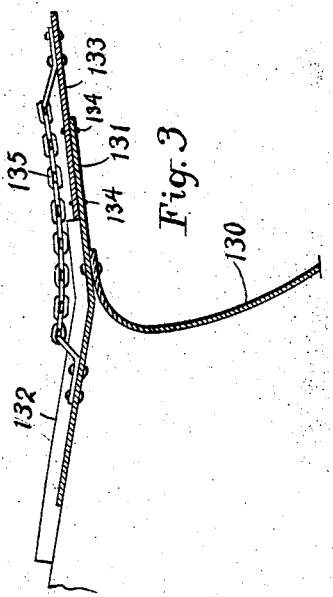
Witnesses;
Inventor,
James W. Russell;
By A. B. Upham,
His Attorney.

No. 721,241. PATENTED FEB. 24, 1903.
J. W. RUSSELL.
SNOW PLOW.
APPLICATION FILED SEPT. 11, 1900.
NO MODEL. 8 SHEETS—SHEET 3.
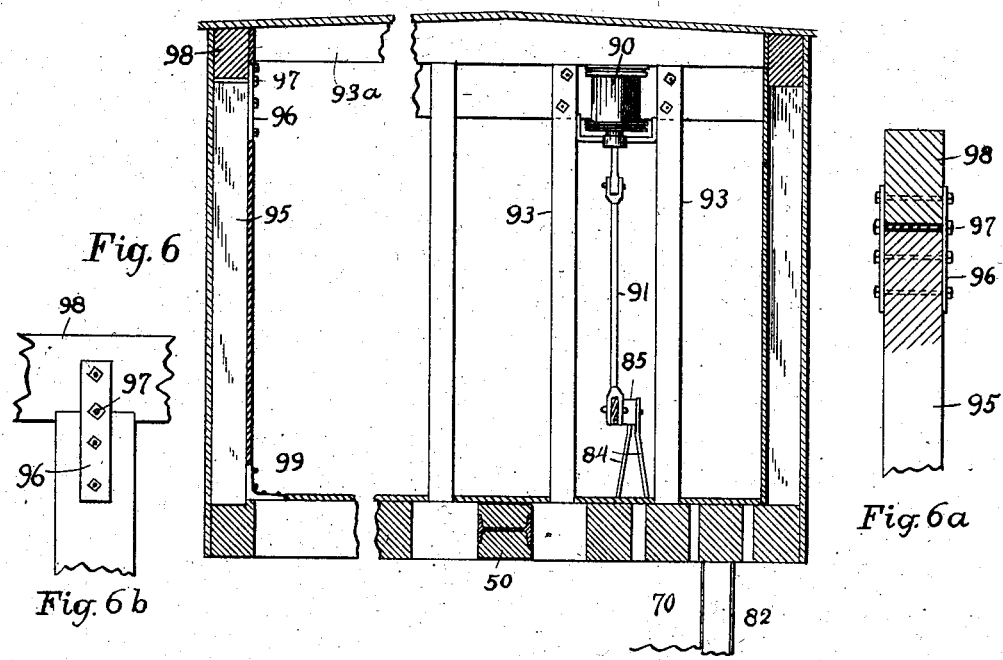
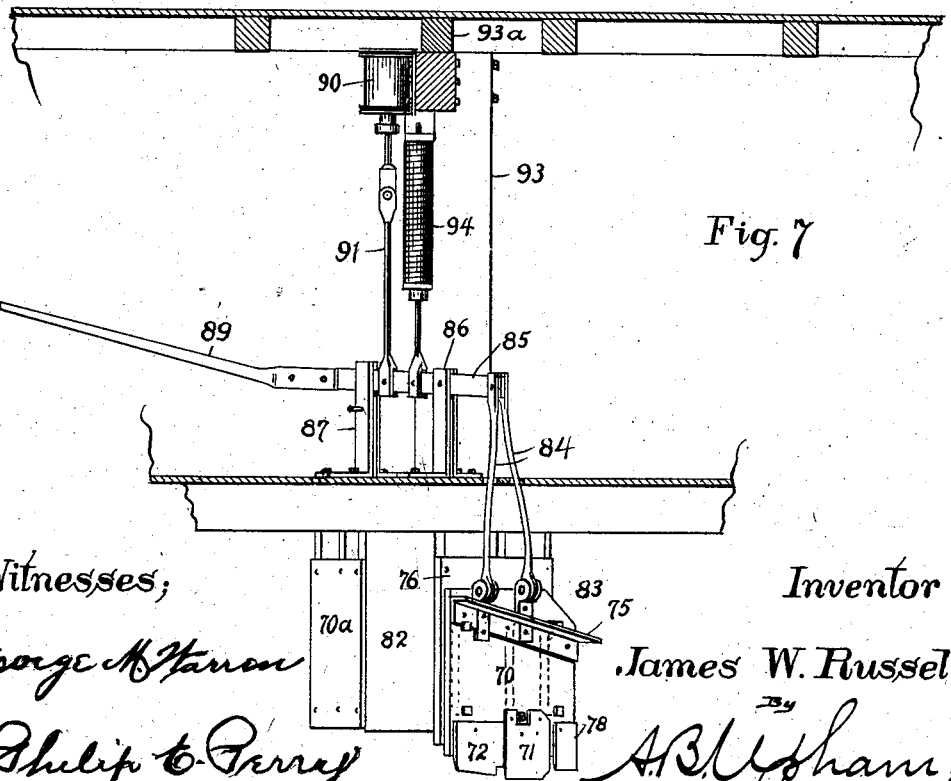
Witnesses;
George M. Harron
Philip E. Perry
Inventor
James W. Russell;
By A. B. Upham,
His Attorney.

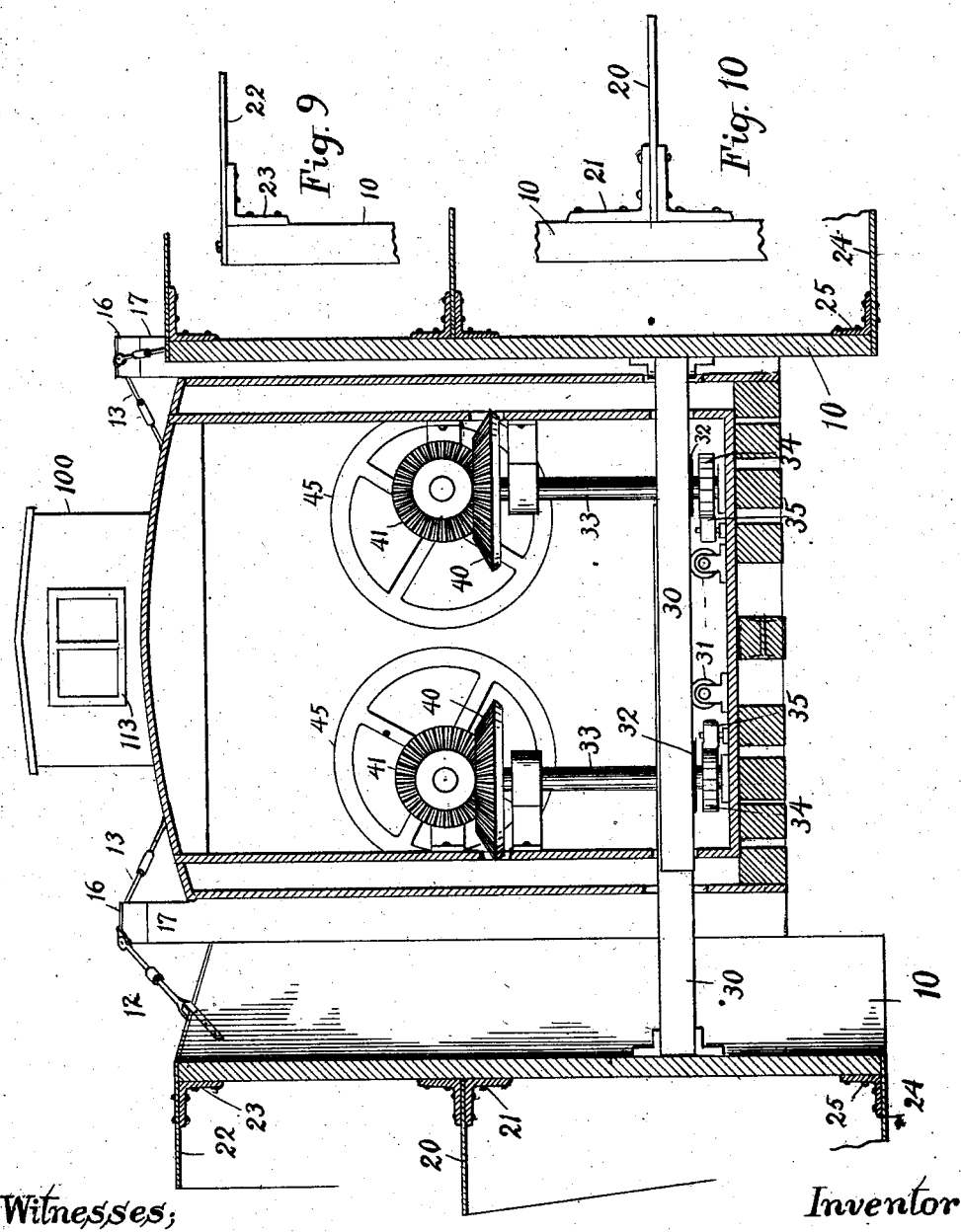

No. 721,241. PATENTED FEB. 24, 1903.
J. W. RUSSELL.
SNOW PLOW.
APPLICATION FILED SEPT. 11, 1900.
NO MODEL. 8 SHEETS—SHEET 6.

Witnesses;
George M. Warren
Philip E. Perry

Inventor,
James W. Russell;
By A. B. Upham,
His Attorney

No. 721,241. PATENTED FEB. 24, 1903.
J. W. RUSSELL.
SNOW PLOW.
APPLICATION FILED SEPT. 11, 1900.
NO MODEL. 8 SHEETS—SHEET 7.
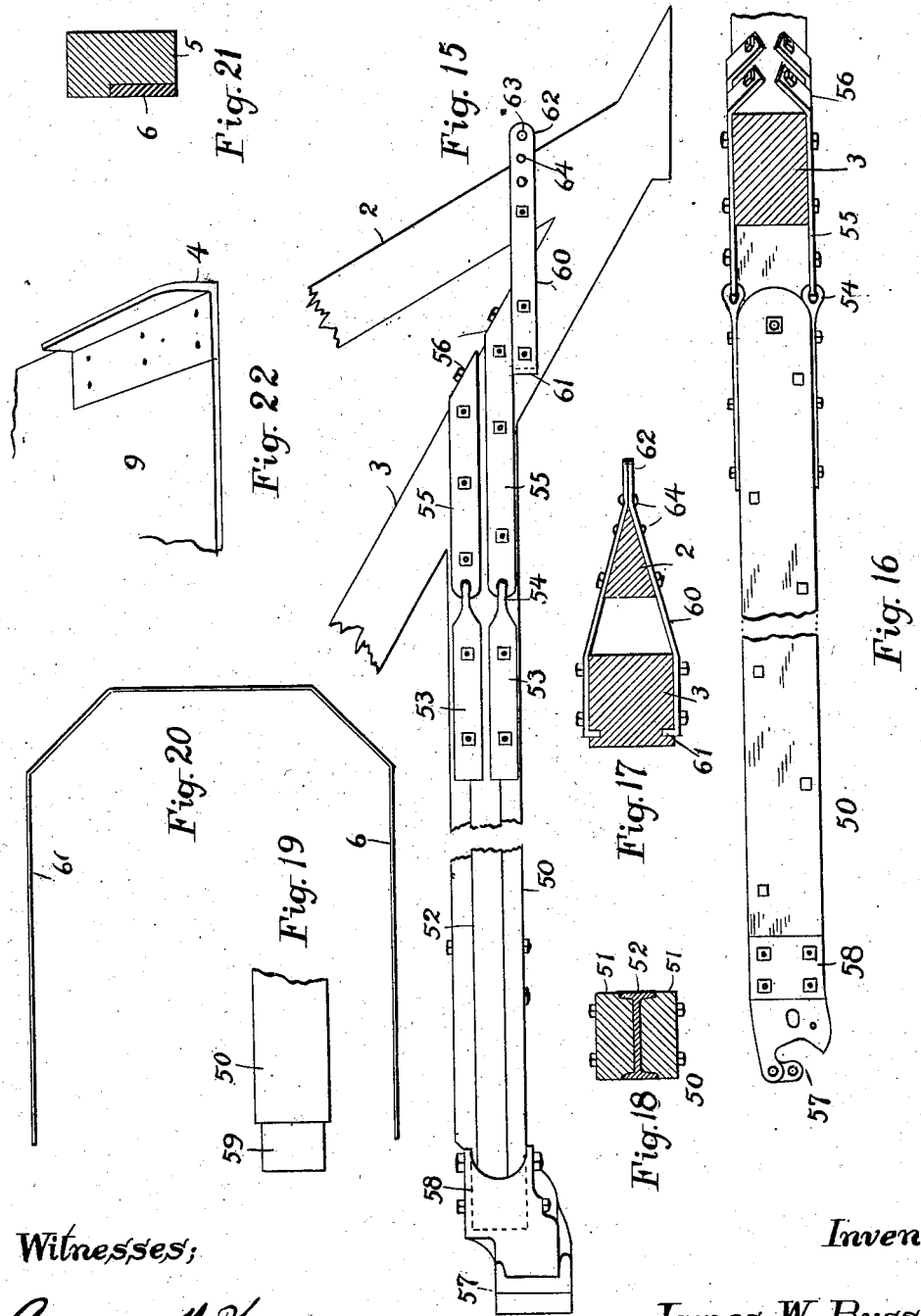
Witnesses:
George M. Warren
Philip E. Perry
Inventor,
James W. Russell;
By A. B. Upham,
His Attorney.

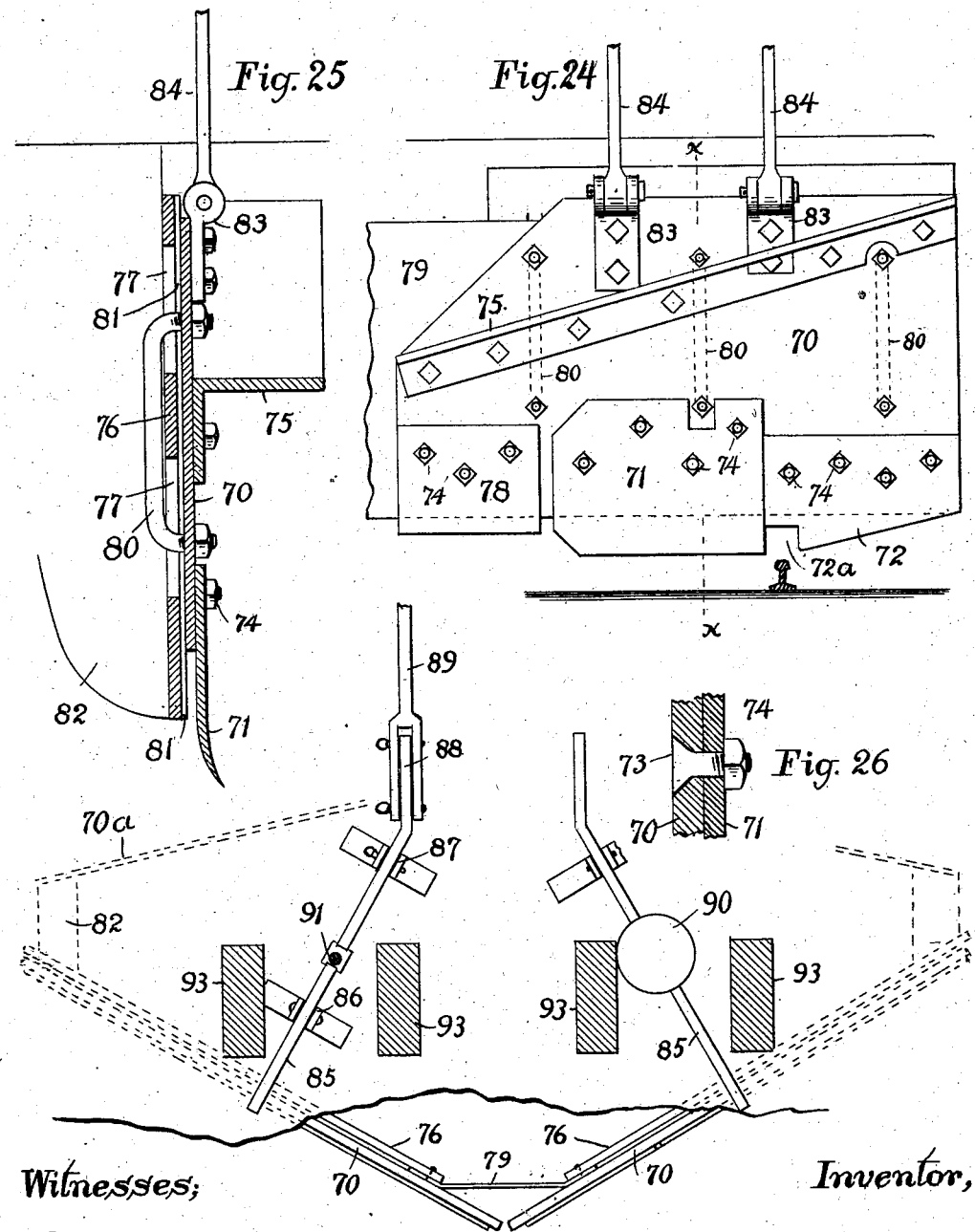

UNITED STATES PATENT OFFICE.

JAMES W. RUSSELL, OF BOSTON, MASSACHUSETTS, ASSIGNOR TO RUSSELL CAR AND SNOW-PLOW COMPANY, A CORPORATION OF MAINE.

SNOW-PLOW.

SPECIFICATION forming part of Letters Patent No. 721,241, dated February 24, 1903.

Application filed September 11, 1900. Serial No. 29,660. (No model.)

*To all whom it may concern:*

Be it known that I, JAMES W. RUSSELL, a citizen of the United States, residing at Boston, county of Suffolk, and Commonwealth of Massachusetts, have invented certain new and useful Improvements in Snow-Plows, of which the following is a full, clear, and exact description.

My invention relates to snow-plows for railways; and its object is the effecting of the improvements briefly enumerated as follows: first, to means for simplifying, improving, and cheapening the construction of the wings of the snow-plow for enabling the snow to be better delivered from the wings and preventing the same from being deposited upon the rear or cab roof or falling back upon the track, for strengthening the pivotal support of the wings, for so arranging and constructing the wing-operating mechanism as to provide room in the cab for the introduction of flanger-operating mechanism and to give a central passage for the men from end to end within the plow, and also for so improving the wing-operating mechanism as to permit it to be more easily and quickly manipulated and so as to prevent accident to wing or plow in case of excessive pressure against the wing when in use; second, to improvements in the hooding or fender at the top of the nose of the plow for adapting it to more readily clear itself of the snow which might otherwise pack beneath it and to means whereby any undue excess of pressure shall simply break the fastenings of the fender-extension plate and dislodge it instead of buckling and destroying the hooding or fender itself; third, to improvements in the power-bar for giving it increased rigidity and strength and for providing it with an automatic coupler; fourth, to an improved draw-bar for enabling the plow to be coupled behind an engine or as a part of a freight-train in being transported from one point to another; fifth, to means for enabling a flanger to be combined with a wing snow-plow and to improvements in the construction of the flanger itself and in the flanger-operating mechanism; sixth, to improvements in the side cutters of the plow and to means for strengthening and bracing the hanging sides or guards of the plow; seventh, to certain improvements in details of construction hereinafter set forth.

Figure 12:
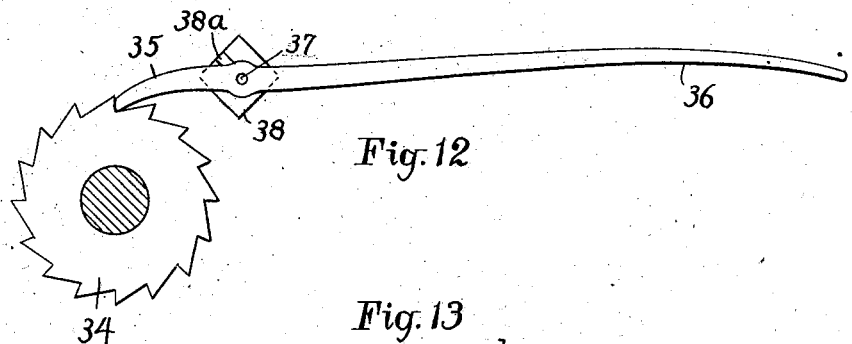
Figure 13:
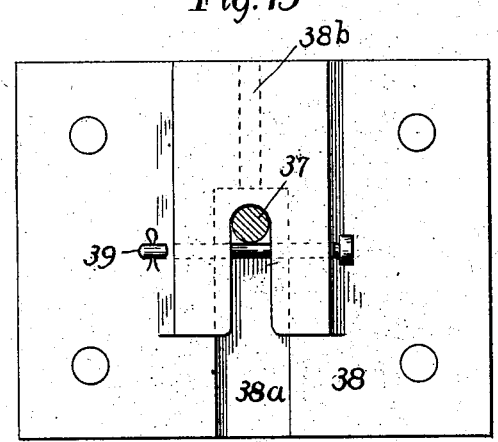
Figure 14:
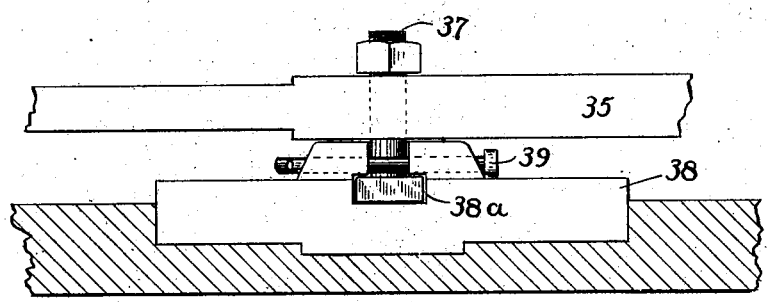

Referring to the drawings forming part of this specification, Figure 1 is a side elevation of the main portion of my snow-plow. Fig. 2 is a plan view of the same. Fig. 3 is a detail sectional elevation illustrating the method of securing the hooding or fender extension to the hooding of the snow-plow. Fig. 4 is a detail plan view of the saddle-casting forming a part of the truss-support of the wings. Fig. 5 is a sectional view of said saddle. Fig. 6 is a transverse elevation of the snow-plow in the vicinity of the flanger. Fig. 7 is a longitudinal section of the same at said point. Fig. 8 is a transverse section of the snow-plow, illustrating the mechanism for operating the wings. Fig. 9 is a detail view of the top plate of one of the wings. Fig. 10 is a detail view showing my method of forming the wing-elevators. Fig. 11 is a sectional plan view illustrating the wing-operating mechanism. Fig. 12 is a detail view of the ratchet located on the upright shaft carrying the pinion engaging one of the wing-racks and of the elongated pawl controlling the same. Fig. 13 is a nearly full size plan view of the casting carrying the pivot of said pawl. Fig. 14 is an elevation of said casting and pivot. Fig. 15 is a side elevation of a portion of the plow-timbers and of the power-bar. Fig. 16 is a plan view of said power-bar. Fig. 17 is a horizontal section of said plow-timbers immediately below said power-bar. Fig. 18 is a cross-section of said power-bar. Fig. 19 is a detail view of the end of said bar adapted to receive the coupler. Fig. 20 is a plan view of the brace-bar for strengthening the hanging sides of the plow. Fig. 21 is a transverse section of said brace and of the beam strengthened by it. Fig. 22 is a perspective view of one of the side cutters. Fig. 23 is a plan view of the flanger and its operating mechanism. Fig. 24 is a front elevation of one-half of said flanger. Fig. 25 is a sectional elevation of the same through the line *x x* in Fig. 24. Fig. 26 is a detail view of the means for securing the flanger-plates in place. Fig. 27 is an elevation, and Fig. 28 a perspective view, of one of the flanger-brackets.

Referring to Fig. 1, the reference-numeral 1 indicates the share or nose of my snow-plow; 10, one of the wings thereof; 100, the lookout; and 120 a portion of the rear or cab section.

The wings 10 are hinged in recesses formed in the side of the snow-plow, just back of the incline or plow proper thereof, these wings being thrown outwardly by means of the rack-bars 30, as set forth in patent to J. H. Russell issued February 4, 1890, No. 420,467. In the previous construction of wings of this character it has been customary to build the elevators thereof by bolting on suitably-shaped timbers covered by steel plates. This was a very laborious and time-consuming operation, requiring much careful work to suitably hew the timbers into shape and to bend and bolt the metal facings thereon.

To enable my snow-plow wings to be made much more simply and economically, both as regards the time expended thereon and materials used, I have devised means whereby the elevators may be constructed from ordinary structural iron. As shown in Figs. 1, 8, and 10, each elevator consists of the flat metal plate 20, rigidly secured to the wing by means of the angle-irons 21, rigidly bolted or riveted thereto. As is evident, it is a comparatively simple and quick operation to cut to the proper lengths such plates and angle-irons and secure them in place. In this way the elevator is not only more cheaply made, but in case of necessary repairs such can be thereby much more easily attended to. At the lower edge of each wing are constructed flat plates 24, secured in place by means of the angle-irons 25, rigidly secured both to the wing and plates. As a further improvement I form a similar flange at the upper edge of each wing, these flanges comprising the flat plates 22, secured in place by means of the angle-irons 23. The object of these flanges is to prevent the snow from crowding up over the upper edge of the wings and falling back on the track or accumulating upon the top of the cab-section.

In wings designed to handle but a moderate amount of snow the elevators may be formed of the angle-irons only, omitting the plates; but for general work the combination of both is to be preferred. In the previous construction of these wings it has been customary to support them by means of a pivotal truss comprising rods 12 and 13, pivoted upon the upper ends of the posts 15, as shown in said patent to J. H. Russell, the means by which these truss-rods were supported comprising a saddle 15 and a short section or strap 14, crossing said saddle parallel to the sides of the plow. The difficulty with this construction has been that when a wing was extended this strap 14 would form an angle with the truss-rods 12 and 13 and would, hence, under the downward pressure of the snow upon the wings tend to twist the posts 17 and saddles 15, and thereby weaken and injure the same. I have succeeded in obviating this defect by forming the saddle 15 with a groove 16, extending in the direction which the rods 12 maintain when the wings are fully extended, the strap 14 lying in said grooves. As is evident from inspection of Fig. 2, this arrangement places the truss-rods 12 and 13 and said strap 14 in the same vertical plane when the wings are fully extended, and thereby prevents any torsional strain upon the saddles or posts. I further improve upon this arrangement by locating the pivot-eyes 11 of the straps 14 vertically in line with the hinges or pivots of the wings, and thereby prevent any lateral deflection thereof and binding effect when the wings are opened or closed.

In the operation of snow-plows of this character it is essential that the wings shall be capable of instant operation in order that they may be instantly drawn in as soon as any dangerous obstruction is seen, as a bridge, and that they may be as quickly thrown outwardly again when such obstructions are passed, and thereby leave no lengthy section of snow unremoved. In my former construction of such wings I have operated the same by means of rack-bars 30, meshing with pinions 32, mounted upon shafts 33, said shafts being rotated by the hand-wheels 45, connected therewith by suitable shafting and bevel-gears 40 and 41. I now provide means for holding the wings in their extended positions, such means consisting in providing said shafts with ratchet-wheels 34, engaged by pawls 35, as shown in Figs. 8 and 11, while to prevent the wings from moving outwardly except when desired the shafts 43 of the hand-wheels 45 are provided with ratchet-wheels 46, engaged by pawls 47. Hence the instant the operator desires to throw one of the wings in or out he must disengage either one or the other of said pawls. The operator being obliged to stand in close proximity to the hand-wheels 45, it might happen when a sudden obstruction appeared that before he could reach the pawl 35 and return the wings to their inward position the obstruction would be reached and the wings badly damaged, if not the entire snow-plow derailed or wrecked. To prevent any such dangerous occurrence, I provide the pawl 35 with an extension 36, as shown in Fig. 11, approaching near enough to its hand-wheel 45 to enable the operator without stirring from the spot to instantly disengage the pawl from the ratchet which it controls. This is an exceedingly valuable feature and has enabled my snow-plows to avoid accidents which would otherwise have entailed great expense and delay. Even when the release of the wings is thus expedited accidents may occur in attempting to handle larger bodies of snow than the size of the plow used was meant to handle or from any unexpected or unusual obstruction. What I have done in this direction is to form each pawl 35 with an easily-breakable pivot in order that the dangerous excess of pressure should destroy nothing valuable, but only what can be easily replaced with duplicates carried within the plow. My device for this purpose is shown in Figs. 13 and 14, in which 37 is the pivot, having its head laterally slidable in the groove 38ª of the casting 38, said pivot being normally retained in its groove by means of the slender pin 39. The pressure upon the pivot or bolt 37 is in such direction as to keep the pivot in its proper place, as shown in Fig. 13. In case of the excessive pressure upon the wings above referred to the pivot or bolt 37 will be sheared off by the pawl, and thus allow the wing to close and free itself. Duplicate pivots or bolts are carried within the plow to replace those broken. The delay and expense of accidents from such cause are thus obviated. The relative arrangement of the ratchet-wheel, pawl, and pivot-casting and its groove is shown in Fig. 12. An opening 38ᵇ is provided in the block 38, through which any suitable object, as a pin 39, can be inserted for the purpose of driving out the pivot-head should the latter be wedged in place when the pivot is sheared off. By means of these improvements—namely, the pawl extension and the breakable pivots therefor—there is absolutely no danger of serious accident to the wings or their operating mechanism should any obstruction be met or undue pressure of snow struck.

As previously constructed the rack-bars 30 were located one above the other and the operating machinery extended to the rear of the same, so filling up the rear or cab section of the plow as to prevent any possible location of flanger-operating mechanism at such place, which is the only proper part of the plow for the flanger. Moreover, the contracted section or waist of the plow-body caused by the wing-receiving recesses was too narrow to receive the wing-actuating devices and still leave room for the passage of the men between the rear of the plow and the lookout. Consequently before my invention it had never been possible to provide a wing-elevator plow with a flanger; but the latter was obliged to be carried by a separate car or other piece of rolling-stock. I have overcome these difficulties by means of the construction illustrated in Figs. 8 and 11. I locate the rack-bars 30 in preferably the same horizontal plane and bring the hand-wheels 45 toward the front, also so lengthen the shaft 43 of one of said hand-wheels as to cause the hand-wheels to be far enough apart to permit any one to pass between the same in going from one end to the other of the snow-plow. The rack-bars 30 being also brought near the floor are easily stepped over, and the entire mechanism is so arranged as to allow ample space for the passage of the men. Moreover, by thus having this operating mechanism located between said racks and the front of the plow the space to the rear of said racks is left entirely free for the operating mechanism of a flanger, the location of which flanger is shown by dotted lines in Figs. 2 and 11. Said rack-bars are provided with rolls 31ª for keeping them in mesh with the pinions 32 and with rolls 31 for supporting them. Not only do I thus make room for the operating mechanism of a flanger and am thus enabled to combine the same with a wing-elevator snow-plow, a thing which has never before been accomplished, but I have also simplified, strengthened, and improved in many particulars the flanger itself.

Referring to Figs. 23 to 25, it will be seen that the flanger, which is made in two sections forming an oblique angle to each other, is supported below the floor of the snow-plow and adapted to be raised and lowered in order to enable it to clean out the snow from between the track-rails and to be instantly raised whenever a frog, switch, or other obstruction is met. I construct each section from a steel plate 70, having secured to the front thereof what might be called a "hooding" or "fender" 75, by which an accumulation of snow is prevented from rising upward and obstructing the space between the flanger and the car-floor or falling over the flanger and back upon the track. This fender will also cause the snow to be confined and thrown out in a more compact body and farther away from the track. This slide-plate 70 is provided at its lower edge with a series of blades, to be hereinafter described. Said plate is supported by means of connecting-rods 84, united thereto by the hinges or connections 83 and passing therefrom to the operating-levers 85.

As previously constructed the plates 70 were movably secured to the fixed plate 76 by means of yokes 80 upon the outer face of said plates 70 and passing through slots therein and secured to plate 76, which was rigidly secured to the brackets 82. This was highly objectionable, inasmuch as said yokes 80 offered an undue obstruction to the snow, thereby preventing the same from being easily thrown to the outside of the track, and, furthermore, permitted the slots to be packed with snow and ice, and thereby interfere with the free action of the flanger. Still other objections were found in practice to these exposed yokes and slots in the front plate of the flanger. I have improved upon this by securing the plates 70 upon the fixed plates 76, having slots 77 in the latter, through which pass the yokes 80, which are rigidly secured to said plates 70 from the rear thereof, thus leaving the slide-plates with a substantially clear or unobstructed external face. Between said slide-plates and fixed plates are located a series of rubbing-strips 81, secured vertically in place, as shown in Fig. 25, while the plates 76 are secured together by means of the thin plate 79, having its lateral edges bent to suitably allow the same to be bolted to the plates 76, this plate 79 serving the double purpose of a tie-plate to the fixed plates 76 and of rubbing-strips for the slide-plates.

I further improve the flanger by having the scraper-blades 71, 72, and 78 attached to the flanger-plate 70 by bolts that under certain conditions will be broken and have such bolts capable of easy renewal. These bolts 73 have nuts 74 thereof upon the outer faces of said blades and the countersunk flat heads inward. Whenever, therefore, through the inadvertent omission to raise the flanger the blades meet some obstruction by which they are bent and otherwise injured, the bolts 73 can be removed and said blades replaced by perfect ones. Duplicate blades are carried within the plow for this purpose.

As shown in Fig. 25, the lower portions of the blades 71 and 72 are preferably reduced in thickness at their lower points and also bent outwardly, to more easily cut under and elevate packed snow and ice. I also prefer to make the bolts 73 so weak that they will break and permit said blades to be pulled off by the obstruction met by them before the flanger itself will yield, thereby saving the latter from any possibility of injury in case the blade does not so bend as to allow of clearance.

To enable this snow-plow to be moved backward without danger of the snow's accumulating behind the flanger, I provide plates $70^a$, secured to the rear of the brackets 82 and forming a slightly-obtuse angle to each other for the purpose of throwing to the sides whatever snow would otherwise accumulate in the flanger itself. One thin plate, bent as required, may be used instead of two for this purpose.

As will be noticed by reference to Fig. 24, the inner upper corner of the sliding plate 70 is cut off at an angle of approximately forty-five degrees, and thereby reduced in height thereat, in order to leave space for the passage of the brake-rods. It will be further observed, both upon reference to Fig. 24 and Fig. 23, that the flanger-plates 70 are entirely separated from each other and each provided with its own operating-lever 85, and thereby made capable of independent movement. By this construction in case one half of the flanger is disabled the other half can be used and one half the track cleared as the snow-plow advances in one direction, while the same half of the flanger will clear the other side of the track when the snow-plow returns. In this manner the flanger can be used even though one half of it has been disabled and without waiting for the repairs and the lengthy delays entailed by having the two sections of the flanger united, as in the old form of construction.

It will be seen that the two fixed plates 76 do not meet in the center of the car or plow by several inches, thus leaving an opening for the passage of brake-rods, as also reducing weight and cost of the flanger.

Referring to the connections or hinges 83 for the down-rods 84 for uniting the plate 70 with lever 85, I have located these hinges 83 at the top of said plate 70 to keep the hinges up out of the way of the snow. Formerly the rod 84 extended below the top of the sliding plate 70 and to the center of the hinge or connection used. This I have improved upon by enabling the down-rods 84 to be attached to connection 83 at its top instead of its center.

In the brackets formerly used as a support or backing for the rigid plate 76 they were formed with a projection in advance of the front or face at the top of the same, through which a bolt passed uniting the bracket to the sill of the car or plow. This projection or lug I omit from my present brackets, whereby I am enabled to use a wider slide-plate 70, with a hooding or fender 75, and connect down-rods 84 at a point above the hooding or fender, so they will not be exposed to the run of the snow.

In the former construction of scraper-blades the plate or blade 72 was made straight upon its lower edge and adapted to remove the snow or ice down to within a fraction of an inch from the upper edge of the rail. Whenever such unremoved snow became sufficiently impacted and frozen as to be practically ice the locomotive-wheels, the treads of which projected beyond the rails, would be unable to get proper adhesion upon the rails, but would instead slip upon such ice. I have improved this plate 72 by forming it with the notch $72^a$, and thus having its lower edge cut two inches, more or less, below the top of the rail. This will prevent the accumulation of impacted or frozen snow just outside of the head of the rail and allow the driving-wheels of the locomotive to get the rail, thus avoiding the trouble stated.

In the previous construction of flangers it has been the custom to have the outer ends thereof in substantial alinement with the sides of the snow-plow or car to which it was attached. In the use of the flanger through a cutting or drift of snow where the snow at the immediate side of the track would be three or more feet in depth, or somewhat higher than the top of the flanger, there would be no chance for the snow removed by the flanger to escape beyond the side of the car, because of the wall of snow at the side of the car or plow, as mentioned. The result would be, if this cutting or drift was other than a very short one, that sufficient snow would be accumulated by the flanger to fill up beneath the plow and cause it to be derailed. I have removed this danger by making the flanger approximately a foot less in width at each side than is the snow-plow or car where the flanger is attached, and thereby permitting room for the escape of the snow between the end of the flanger and the wall at the side of the track.

The means for raising and lowering the flanger comprise the levers 85, pivoted at 86. In order to enable this lever to be operated by hand, I provide an extension 89 therefor secured to the ends 88, but usually these flangers are operated by means of the cylinders 90, which in turn may be operated by either air or steam from the locomotive connected thereto by the connecting-rods 91. This is shown more completely in Figs. 6 and 7. I furnish a lock-guide 87 to the levers 85. By inserting a pin through this lock-guide 87 of the lever the flanger may be locked up, as is often required.

As is shown in Fig. 7, the lever 85 for operating each flanger is provided with a spiral spring 94, adapted by its resilient pressure to counterbalance the weight of such flanger and in such manner lessen the work required of the cylinder 90 or of the hand-lever when operated by hand.

As is shown in Fig. 23, the lever 85 is provided with an extension 89, designed to be applied thereto only in case it is wished to operate such lever by hand instead of by the cylinder. Said extension 89 is formed with a forked end adapted to straddle the end of the lever and attached thereto by means of suitable pins or bolts passing through the same. While these cylinders may be operated with either steam or air, the latter is preferable.

As the air appliance may get out of condition for use the lever extension bar 89 is furnished, so that the flanger may then be operated by hand.

It will be seen that the lever 85 is connected directly to the cylinder by the rod 91. This is a great improvement over the former methods of construction, where cylinders were employed to operate the flanger. The former method was to connect the rod 91 to a cast-iron arm or lever united to a shaft, which shaft also carried another cast-iron arm of different length, which in turn was connected to the down-rod that ultimately was connected to the slide-plate. My present method is more reliable in that in the former way the two arms under the strain put upon them would work loose upon the shaft to which they were attached. This is avoided in having only the one lever and no shafting. My present construction is also simpler and cheaper and a more direct application of the operating power to the slide-plate of the flanger, in all respects more satisfactory than any other known way of producing the desired results.

The arrangement of the flanger, as shown in Fig. 23, is that for use on single-track roads. It is evident, however, that this flanger, with its many improved features, is equally adapted for use on roads with two or more parallel tracks, commonly called "double-track" roads, in which case the flanger-plates 70 and 76 would extend unbroken from the outside of one rail to the outside of the other rail instead of being in two pieces, as shown in the type of flanger illustrated, many of the essential features and improvements of the flanger, as shown, remaining the same whether made for use on single-track or double-track roads. This general style of flanger may be spoken of as of the "vertical" type. Other styles of flangers have been used, such being hinged or supported so as to tilt or tip up and pass over any obstruction; but such have been found unsatisfactory, especially when hard work was required of them, in that when considerable pressure was upon them from very hard snow or ice the flanger would lift or yield, and the portion of track most required to be cleaned would be passed over uncleared. In a flanger of the vertical type, as shown, the pressure from snow against it has not the tendency to lift it, as in the former type, and much better results have been achieved. I believe that my flanger, as shown, is not only the most perfect ever designed for ordinary work, but is the only one that will successfully remove ice from the track. In the previous construction of flangers of this general type it has been customary to form the frame-timbers in a broken line corresponding with the flanger-sections. This has been both inconvenient, expensive, and lacking in strength and durability. I have improved upon this faulty arrangement by locating the timbers in a straight line across the plow-body, as in Fig. 23, in which are shown the posts 93 in section. This permits of the car-line or top plate 93$^a$ and the sills of the flanger-frame to be cut square and to be securely framed to the car at right angles with the same. I thus better obtain a firm and unyielding as also less expensive construction.

The pressure of snow against the wings is transferred through the various parts of the wing-operating appliance to the upright shaft of same, which is supported at its upper end and at its center by braces of bar-iron or other suitable material, which are connected to the posts in the side framing of the car or plow. The strain against the rollers holding the rack against the pinion, which is considerable, is also largely sustained by braces to the above-mentioned posts in the side of the plow. The usual method of securing the posts at each end to the adjoining timbers of the car is with tenon and mortise. It is evident that such construction would not stand the great strain above-mentioned.

This snow-plow is impelled by means of a push-bar 50, pivoted near the forward end of the snow-plow and running back beneath the floor to the rear end of the car, where it is coupled to the locomotive. This feature is shown in patent issued to J. H. Russell, No. 300,016. I have improved this power-bar in several particulars. First, I have devised means whereby an automatic coupler 57 can be attached directly and rigidly to the rear end of this push-bar or power-bar, and thereby enable the plow to be coupled automatically to locomotives provided with standard automatic couplings. This is shown more fully in Figs. 15 and 16, where it will be seen that the coupler-head is formed with a socket 58, adapted to fit over the reduced end 59 of the power-bar 50. This gives us substantially an automatic coupler which extends nearly the whole length of the plow. I further improve the push-bar itself by forming it in two sections, clamping between them a length of I-beam 52, said section 51 being preferably of oak and the parts being clamped together by means of suitable bolts extending transversely through the same, as shown in Fig. 18. This push-bar is pivotally secured near the front end of the snow-plow by means of the straps 53, having eyes 54, engaging suitable eyes of the straps 55, the latter straps having their ends 56 bent about and bolted to the forward faces of the incline beam 3, as shown in Figs. 15 and 16. Other and suitable means may be employed by which to connect this power-bar to the snow-plow.

To construct a draw-bar for the front of this snow-plow, I take two lengths of bar iron or steel 60, preferably made with a hook at their rear ends and united at their front ends along the acute sides of the nose-beam 2, as shown in Figs. 15 and 17, suitable rivets and bolts 64 being used for securing the forward ends together and an eye 63 made through the same for enabling suitable coupling or draw-bar to be connected therewith.

As shown in Fig. 1, the front truck of the snow-plow is protected by extending the sides of the snow-plow vertically downward and having such extensions or hanging guards suitably braced. These braces comprise the horizontal timbers 5, having inserted in the inner edge thereof the brace-bar 6, as shown in Fig. 21, the form of which brace-bar is shown in Fig. 20, the same extending across from side to side of said hanging portion of the snow-plow.

In the previous construction of snow-plows of this character side cutters 4 are formed by means of a flat plate of metal bent at right angles and combined with a straight plate, the two parts being secured together with rivets. I have, however, improved upon the same, making it stronger and less expensive, by forming each of said cutters from a single length of angle-iron, one flange of which is bolted or otherwise secured to the face of the incline and the other of which forms the side cutter desired, thus avoiding the necessity and expense of bending sheet-iron. One of the main difficulties with snow-plows of this type is that snow is liable to crowd up the incline 9 and accumulate upon the roof of the snow-plow in front of the lookout-windows, thereby interfering dangerously with the view of the men in charge of the plow. To prevent this, it is customary to construct what is termed a "hooding" or "fender" projecting forward from the upper edge of the snow-plow, by means of which the snow is deflected from such upward course and carried laterally away from the snow-plow. There are, however, two difficulties inherent in this construction. The first is that in case this hooding does not extend far enough the snow will pass over the top of the plow, pile up in front of the lookout, accumulate on the engine, or fall back upon the track. On the other hand, if this hooding is increased in dimensions sufficiently to prevent the snow from thus passing over it there are two other difficulties encountered, the first being either that there will be such an accumulation of snow upon the plow as to stall the train whenever a heavier drift is encountered than the plow is made to handle or that the upward pressure of the snow will be sufficient to break the hooding, and thereby both cover the snow-plow front and also endanger by the force with which this hooding is thrown backward the men in the plow and locomotive, or it may fall down and get underneath the plow or engine and cause derailment thereof. To overcome all these difficulties, I have devised a hooding which, while sufficient for all ordinary snows, is capable of yielding to an excess of pressure without causing the objections above referred to or interfering with the efficiency of the snow-plow for more than a brief interval. I have accomplished this by means of the construction set forth in Figs. 2 and 3 of the drawings. As will be seen more clearly in Fig. 3, the hooding 131, reaching forward from the nose of the snow-plow, extends to but a moderate distance, such hooding being constructed of heavy plates suitably fastened at the top and front of the snow-plow and strengthened by means of the metal bars 132. Upon the upper front section of this hooding I secure what I term a "hooding extension" 133 at each side of the snow-plow nose. But few rivets are used in connecting these two plates together in order that they will break when there is excessive pressure upon the hooding or fender extension. Hence whenever the snow-plow enters a drift the upward pressure of which overcomes the tensional strength of said rivets the hooding extensions 133 will be broken away from their normal positions, and so the strain upon the hooding relieved, thereby preventing any possibility of injuring vital parts of the hooding or snow-plow itself. By means of suitable bolts carried by the men in the snow-plow these hooding extensions 133 can be with but a few minutes delay restored to their places and the work continued. Inasmuch as the snow-plow is usually driven at a high rate of speed and the resistance of such accumulated snow against the hooding extensions sufficient to throw them backward with great force, and thereby endanger the lives of the attendants either of the plow or locomotive, I provide flexible links of chains 135, rigidly fastened both to the extensions and to the hooding itself or to the top of the plow, and thereby prevent said extensions from being thrown more than a short distance. By means of this construction all such danger is wholly overcome.

To reinforce the hooding proper I use a bar of iron or steel 132. (Shown in Figs. 2 and 3.) This strengthens the hooding and avoids using much heavier and therefore more expensive plates and ones more difficult to bend. More than one of these bars should be used on each side of the top of the plow, as shown in Fig. 2. This reinforcing-bar may be made of flat T or angle iron or any other suitable shape. In my former construction of this hooding or fender, as shown in my Patent No. 470,951, the main plate 131 was used flat or straight. The slant in the roof of the plow would therefore cause the front end of the fender to slant or point downward toward the track, whereas the run of the snow was upward. It will be seen in Fig. 3 that I have bent this plate, throwing the forward end of it upward to enable the snow to be thrown from the plow in the more upwardly direction desired. The forward part of this main plate 131, that inclines upward, may be slightly curved instead of being straight.

In the drawings shown herewith a single-track plow is shown. When my hooding is required for use upon a double-track snow-plow, it is evident that as the latter has but one share or moldboard instead of two plates, one on each side of the plow, as shown, one plate of each style will be required; but generally such will be of greater length, the new and valuable features of this fender being desirable in each case and remaining unchanged.

It will be seen that by means of my invention I have rendered the snow-plow perfectly capable of accomplishing the work required thereof, making the same complete in itself, so that the one machine performs work heretofore done by means of from two to three entirely separate appliances or crews. Prior to my invention a flanger could not be applied upon a wing-elevator snow-plow, and hence after the snow-plow train had passed over a section of the track it was necessary to follow the same with a flanger carried by its special train for cleaning out the snow between the track-rails.

With the use of this complete appliance all of the snow that it is desired to remove from the road—that is, from below the head of the rail to several feet above the rail and to a width considerably beyond the sides of the widest cars, a work formerly requiring two and sometimes three separate and distinct appliances or trains to properly accomplish—I now do with this one complete snow-plow, as stated. I have further so improved the same as to render it practically impossible for the snow-plow to be seriously injured in the usual ways, and thereby I render it not only complete and efficient, but in many respects indestructible and a great saver both of delays and dangerous accidents.

It is evident that when a storm is on and an added number of engines are required to pull every train and train-crews are being overworked the fact that we largely reduce the number of engines and train crews required for the snow-plow service, as well as the first cost of the snow-fighting equipment and the cost of maintaining the same, is a matter of considerable importance.

The power-bar and flanger herein described are specifically set forth and claimed in my companion applications, Serial No. 78,983, filed October 17, 1901, and Serial No. 81,682, filed November 9, 1901.

What I claim as my invention, and for which I desire Letters Patent, is as follows, to wit:

1. In a wing snow-plow the combination with the wings, of elevators therefor constituted by the metal plates and the angle-irons rigidly securing said plates to said wings, substantially as described.

2. The combination with a snow-plow and wings hinged thereto at the rear of the share, of flanges formed at the upper edges of said wings, substantially as described.

3. In a wing snow-plow the combination with the wings, of the elevators, and the flanges at the upper edges of said wings, said elevators and flanges being composed of the plates and angle-irons secured together and to the wings, substantially as described.

4. In a wing snow-plow, the combination with the wings, of the truss-supports therefor, such truss-supports having a pivot in line with the pivots or hinges of the wings, substantially as described.

5. In a wing snow-plow, the combination with the posts and the hinged wings, of the saddle-castings secured at the tops of said posts and having the oblique grooves or channels therein, the straps supported in said oblique channels, and the truss-rods connected with said straps, substantially as described.

6. In a wing snow-plow, the combination with the posts and the hinged wings, of the saddle-castings secured at the tops of said posts and having the grooves or channels in the same vertical planes with the wings when in their extended positions, the straps supported in said saddle-channels, and the truss-rods connecting said straps to the plow and to the wings, substantially as described.

7. In a snow-plow having its sides recessed and wings formed with elevators hinged in said recesses, the combination therewith of wing-operating mechanism constructed to be located between the recessed sides and to permit passage of the attendants between the same, substantially as described.

8. In a snow-plow having its sides recessed and wings formed with elevators hinged in said recesses, the combination with the wings, of the rack-bars connected therewith and located in substantially the same horizontal plane, the pinions meshing with said rack-bars, horizontal shafts, connections between said horizontal shafts and pinions, and hand-wheels fixed on said horizontal shafts for turning said pinions, said rack-bars being located near the floor of the snow-plow and said hand-wheels so positioned relative to each other as to form unimpeded passage for the snow-plow operators over said rack-bars and between said hand-wheels, substantially as described.

9. In a wing snow-plow, the combination of the wings, the rack-bars for operating the same, the pinions meshing with said rack-bars, the vertical shafts carrying said pinions, the horizontal and forwardly-reaching shafts having the hand-wheels thereon, and bevel-gears connecting said shafts, one of said horizontal shafts having its hand-wheel located in advance of the other to permit passage of the attendants from end to end of the car between the same, substantially as described.

10. In a wing snow-plow, the combination with the wings, of means for extending said wings, and breakable and easily-duplicated fastening devices for holding said extending means, substantially as described.

11. In a wing snow-plow, the combination with the wings and bars adapted for forcing the same outwardly, of pawls for holding said rack-bars in their extended positions, and pivots for said pawls adapted to break under a dangerously-excessive pressure against said wings, substantially as described.

12. In a wing snow-plow, the combination with the wing and the rack-bar for holding the same extended, of a pawl constructed for locking said rack-bar, a pivot for said pawl, and a fixed block having an undercut or dovetail groove therein open at one end and closed at the other, said groove being constructed to receive an end of said pivot and hold the same against pressure in one direction, substantially as described.

13. In a wing snow-plow, the combination with the wing and the rack-bar for holding the same extended, of a pawl for locking said rack-bar, and a pivot for said pawl, said pivot comprising a fixed block having the groove therein, the breakable pivot held in said groove, and the pin confining said pivot in said groove, substantially as described.

14. In a wing snow-plow, the combination with a wing, of the rack-bar for operating the same, the pinion meshing with said rack-bar, means for forcibly rotating said pinion, the ratchet-wheel connected with said pinion, the pawl engaging said ratchet-wheel, and a safety-pivot for said pawl, comprising the pivot adapted to be broken away from its normal position under an excess of pressure, substantially as described.

15. In a wing snow-plow, the combination with a wing, of a rack-bar for operating the same, a pinion meshing with said rack-bar, a vertical shaft carrying said pinion, a horizontal shaft geared with said vertical shaft, a hand-wheel on said horizontal shaft, a ratchet on said vertical shaft, and a pawl engaging the same; said pawl having its tail extended to a point near said hand-wheel, substantially as described.

16. In a wing snow-plow, the combination with the wing of a rack-bar connected therewith, a pinion meshing with said rack-bar, a vertical shaft carrying said pinion, a horizontal shaft and bevel-gears connecting it to the vertical shaft, a hand-wheel for turning the horizontal shaft, a ratchet-wheel and pawl connected with the vertical shaft for preventing the closure of said wing, and a ratchet-wheel and pawl connected with the horizontal shaft for preventing the said wing from opening, both said pawls being conveniently operated by an attendant standing at the hand-wheel, substantially as described.

17. In a wing snow-plow, the combination with the wing and means for forcing it open, of a pawl for holding it from closing, and a pawl for holding it from swinging outward, substantially as described.

18. In a snow-plow, the combination therewith of wings, operative mechanism for said wings located between the latter, a flanger beneath the rear section of the snow-plow, and operative mechanism therefor located to the rear of the operative mechanism of the wings, substantially as described.

19. The combination with a laterally-recessed snow-plow and elevator-wings in said recesses, of a flanger for clearing the snow from between the rails of the track, substantially as described.

20. The combination with a track-clearing snow-plow, of a flanger located to the rear of the same but made substantially narrower than the lower, or corresponding portion of the plow, whereby the snow accumulated by the flanger is permitted to escape between the same and the walls of snow left by the plow, substantially as described.

21. In a power-bar for snow-plows, the combination with the two wooden beams of the metallic I-beam secured between the same, substantially as described.

22. In a snow-plow, the combination with the incline timber and nose-beam, of the draw-bar or coupling, comprising the two metal straps having their rear ends formed into a hook or spear set into the said incline timber, and the forward ends thereof brought together and formed with suitable engagement-openings, substantially as described.

23. In a snow-plow, the combination with the incline timber and nose-beam and the power-bar having the straps for securing it to the incline timber, of a coupling-iron separately secured to said beam and incline timber, substantially as described.

24. In a snow-plow, the combination with the side hangers or guards, of the approximately U-shaped metal brace-bar inserted into the edges of said guards and stretching from side to side in front of the snow-plow truck, substantially as described.

25. In a snow-plow, the combination therewith of the cutter-plates, each formed from an angle-iron having one flange thereof secured upon the incline of the snow-plow, substantially as described.

26. In a snow-plow having a substantially flat top to its share, the combination therewith, of a hooding formed of a flat metal plate having the two sections thereof form a slight angle with respect to each other along a longitudinal line, one of which sections is secured upon the top of the share of the snow-plow to present the other section at a slightly-rising angle from the top edge of the share, substantially as described.

27. In a snow-plow having a substantially flat top to its share, the combination therewith of a hooding formed of a flat metal plate having the two sections thereof form a slight angle with respect to each other along a longitudinal line, one of which sections is secured upon the top of the plowshare, while the other section projects forward and slightly upward therefrom; the front of the share being provided with a metal plate curved upward and forward and secured directly to said hooding, substantially as described.

28. The combination with the snow-plow, of the hooding therefor, and the hooding extension adapted to break therefrom without serious injury to itself upon receiving an excess of pressure, substantially as described.

29. The combination with a snow-plow, having the hooding, of the hooding extension breakably fastened thereto, and flexible links connecting said extension and hooding, substantially as described.

30. In a snow-plow, the combination with the hooding, of the brace-bars for bracing said hooding and the hooding extensions breakably connected to said hooding, substantially as described.

31. In a snow-plow, the combination with the share having the metal plate or facing composing it curved forward, of the hooding composed of the metal plate given a slight bend along a longitudinal line and secured upon the top of the share and to said curved edge of the share-facing, and the brace-bars secured to said share-top and hooding, substantially as described.

In testimony that I claim the foregoing invention I have hereunto set my hand this 8th day of September, 1900.

JAMES W. RUSSELL.

Witnesses:
 A. B. UPHAM,
 GEORGE N. WARREN.